United States Patent
Klemen

(10) Patent No.: US 11,466,735 B2
(45) Date of Patent: Oct. 11, 2022

(54) ELECTROMAGNETIC CLUTCH SYSTEM

(71) Applicant: Rolls-Royce Corporation, Indianapolis, IN (US)

(72) Inventor: Donald Klemen, Carmel, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 17/199,065

(22) Filed: Mar. 11, 2021

(65) Prior Publication Data
US 2021/0285504 A1 Sep. 16, 2021

Related U.S. Application Data

(60) Provisional application No. 62/989,162, filed on Mar. 13, 2020.

(51) Int. Cl.
*F16D 27/112* (2006.01)
*F16D 27/00* (2006.01)

(52) U.S. Cl.
CPC ...... *F16D 27/112* (2013.01); *F16D 2027/007* (2013.01); *F16D 2027/008* (2013.01)

(58) Field of Classification Search
CPC .............. F16D 27/112; F16D 2027/007; F16D 2027/008
See application file for complete search history.

(56) References Cited

U.S. PATENT DOCUMENTS

| | | | |
|---|---|---|---|
| 2,101,671 A | 12/1937 | Cooper | |
| 2,692,035 A | 10/1954 | Rabinow | |
| 2,796,963 A | 6/1957 | Harter | |
| 2,937,729 A | 5/1960 | Sperr | |
| 2,979,318 A | 4/1961 | Haspert et al. | |
| 3,016,667 A | 1/1962 | Yves | |
| 3,022,383 A | 2/1962 | Springer | |
| 3,037,601 A | 6/1962 | Wilhelm | |
| 3,358,798 A | 12/1967 | Janson | |

(Continued)

FOREIGN PATENT DOCUMENTS

| | | |
|---|---|---|
| CN | 103042942 A | 4/2013 |
| DE | 19532163 A1 | 3/1997 |

(Continued)

OTHER PUBLICATIONS

US 9,945,431 B2, 04/2018, Fukumura (withdrawn)
U.S. Appl. No. 16/415,580, filed May 17, 2019, by Klemen et al.

*Primary Examiner* — Huan Le
(74) *Attorney, Agent, or Firm* — Shumaker & Sieffert, P.A.

(57) ABSTRACT

In some examples, an electromagnetic clutch assembly. The assembly includes a pair of clutch plates including a first clutch plate configured to rotate around a rotational axis; and a second clutch plate configured to rotate around the rotational axis. The assembly further includes an electromagnetic coil circumferentially surrounding the air gap, wherein the electromagnetic coil is configured to generate a magnetic flux passing through the first clutch plate and the second clutch plate, wherein the pair of clutch plates define an air gap between the first clutch plate and the second clutch plate in the absence of the magnetic flux, and wherein the magnetic flux is configured to cause at least one of the first clutch plate or the second clutch plate to move to close the air gap.

12 Claims, 7 Drawing Sheets

(56) References Cited

U.S. PATENT DOCUMENTS

| | | |
|---|---|---|
| 3,450,238 A | 6/1969 | Adkins |
| 3,455,421 A | 7/1969 | Miller |
| 3,465,862 A | 9/1969 | Birdsall |
| 4,030,583 A | 6/1977 | Miller |
| 4,166,226 A | 8/1979 | Estkowski |
| 4,270,644 A | 6/1981 | Billet |
| 4,545,676 A | 10/1985 | Kato |
| 4,891,619 A | 1/1990 | Booth et al. |
| 5,310,034 A | 5/1994 | Bernabei |
| 5,320,206 A | 6/1994 | Maejima |
| 5,465,819 A | 11/1995 | Weilant et al. |
| 5,669,044 A | 9/1997 | Cuthbert |
| 5,737,900 A | 4/1998 | Konstantin et al. |
| 5,915,513 A | 6/1999 | Isley, Jr. et al. |
| 5,996,759 A | 12/1999 | Aoki et al. |
| 6,127,754 A | 10/2000 | Kolomeitsev et al. |
| 6,149,544 A | 11/2000 | Masberg et al. |
| 6,202,776 B1 | 3/2001 | Masberg et al. |
| 6,209,700 B1 | 4/2001 | Wogaman et al. |
| 6,487,998 B1 | 12/2002 | Masberg et al. |
| 6,568,520 B2 | 5/2003 | Hattori et al. |
| 6,578,689 B2 | 6/2003 | Kawada et al. |
| 6,878,088 B2 | 4/2005 | Williams |
| 7,037,226 B2 | 5/2006 | Zulawski |
| 7,344,479 B2 | 3/2008 | Baek |
| 7,520,373 B2 | 4/2009 | Hill |
| 7,556,134 B2 | 7/2009 | Hill |
| 7,681,704 B2 | 3/2010 | Schenkel, III et al. |
| 7,896,146 B2 | 3/2011 | Pritchard et al. |
| 8,020,683 B2 | 9/2011 | Borys et al. |
| 8,267,232 B2 * | 9/2012 | Knoblauch ............ F16D 27/118 192/84.92 |
| 8,387,767 B2 | 3/2013 | Komorowski et al. |
| 8,499,916 B2 | 8/2013 | Pardee et al. |
| 8,561,773 B2 | 10/2013 | Fukumoto et al. |
| 8,714,330 B2 | 5/2014 | Toyama et al. |
| 8,733,527 B2 | 5/2014 | Greene |
| 8,851,258 B2 | 10/2014 | Komorowski et al. |
| 9,017,215 B2 | 4/2015 | Schmitz et al. |
| 9,109,636 B2 | 8/2015 | Kimes et al. |
| 9,291,216 B2 | 3/2016 | Nakano et al. |
| 9,360,057 B2 | 6/2016 | Mogi |
| 9,476,464 B2 | 10/2016 | Wang et al. |
| 9,482,293 B2 | 11/2016 | Ueda |
| 9,534,642 B2 | 1/2017 | Wang |
| 9,945,430 B2 | 4/2018 | Fukumura |
| 9,982,725 B2 | 5/2018 | Fukumura |
| 10,099,717 B2 | 10/2018 | Shiina |
| 10,113,596 B2 | 10/2018 | Nakajima et al. |
| 10,325,709 B2 * | 6/2019 | Kuwabara ............... H01F 7/206 |
| 2004/0180747 A1 | 9/2004 | Weilant et al. |
| 2005/0167231 A1 | 8/2005 | Kurmaniak |
| 2008/0283352 A1 | 11/2008 | Purvines |
| 2010/0259121 A1 | 10/2010 | Ueda et al. |
| 2010/0307884 A1 | 12/2010 | Ota et al. |
| 2017/0051797 A1 | 2/2017 | Yamatani |
| 2017/0102040 A1 | 4/2017 | Staniewicz et al. |
| 2017/0138415 A1 | 5/2017 | Kitayama et al. |
| 2017/0248174 A1 | 8/2017 | Greene et al. |
| 2018/0119610 A1 | 5/2018 | Hornbrook |
| 2018/0231071 A1 | 8/2018 | Geiser et al. |
| 2019/0032727 A1 | 1/2019 | Hornbrook et al. |
| 2019/0323592 A1 | 10/2019 | Varin |

FOREIGN PATENT DOCUMENTS

| | | |
|---|---|---|
| DE | 19532164 A1 | 3/1997 |
| EP | 0847494 A2 | 6/1998 |
| EP | 0844937 B1 | 1/2000 |
| EP | 0846065 B1 | 11/2001 |
| EP | 0763498 A1 | 11/2003 |
| EP | 1406030 A2 | 4/2004 |
| EP | 1640629 A1 | 3/2006 |
| EP | 1731796 A2 | 12/2006 |
| EP | 2682628 A1 | 1/2014 |
| EP | 3330560 B1 | 3/2019 |
| EP | 3542085 A1 | 9/2019 |
| JP | 07269603 A | 10/1995 |
| WO | 1991016552 A2 | 10/1991 |
| WO | 9708008 A1 | 3/1997 |
| WO | 2002040891 A2 | 5/2002 |
| WO | 2007089850 A2 | 8/2007 |
| WO | 2008029235 A1 | 3/2008 |
| WO | 2013104117 A1 | 7/2013 |
| WO | 2013136560 A1 | 9/2013 |
| WO | 2013143118 A1 | 10/2013 |

* cited by examiner

ELECTROMAGNETIC CLUTCH SYSTEM

This application claims the benefit of U.S. Provisional Patent Application No. 62/989,162, filed Mar. 13, 2020, the entire content of which is hereby incorporated by reference.

TECHNICAL FIELD

The disclosure relates to electromagnetic clutch systems.

BACKGROUND

Gas turbine engines include various accessory components to enable the engine to operate, such as, for example, fuel pumps, oil pumps, electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes assemblies, systems, and techniques that include an electromagnetic clutch assembly with a coil located circumferentially and radially outward relative to clutch plates of the assembly. The coil may be used to generate a magnetic field with a flux that passes through the clutch plates (e.g., substantially normal to contact or friction faces of the clutch plates). The clutch plates may each be formed of a ferromagnetic material that is magnetized in the generated magnetic field. In the generated magnetic field, the clutch plates are magnetically attracted to each other in a manner that closes an air gap between the respective clutch plates to bring the respective plates into contact with each other. When in contact with each other in the presence of the generated magnetic field, the clutch plates may be engaged (e.g., frictionally) such that rotational motion may be transferred from one of the clutch plates to the other clutch plate. In some examples, such an electromagnetic clutch assembly may be used for coupling driven components to a turbine engine (e.g., through an accessory gearbox).

In some examples, the disclosure describes an electromagnetic clutch assembly comprising a pair of clutch plates comprising a first clutch plate configured to rotate around a rotational axis; and a second clutch plate configured to rotate around the rotational axis. The assembly also comprises an electromagnetic coil circumferentially surrounding the air gap, wherein the electromagnetic coil is configured to generate a magnetic flux passing through the first clutch plate and the second clutch plate, wherein the pair of clutch plates define an air gap between the first clutch plate and the second clutch plate in the absence of the magnetic flux, and wherein the magnetic flux is configured to cause at least one of the first clutch plate or the second clutch plate to move to close the air gap.

In some examples, the disclosure describes an electromagnetic clutch assembly comprising a pair of clutch plates comprising a first clutch plate comprising a first friction face configured to rotate around a rotational axis; and a second clutch plate comprising a second friction face configured to rotate around the rotational axis, wherein the second friction face opposes the first friction face. The assembly also comprises an electromagnetic coil wound around an air gap, the air gap being between the first friction face and a second friction face, wherein the electromagnetic coil is configured to generate a magnetic flux passing through the first friction face and the second friction face; and a controller operatively connected to the electromagnetic coil, wherein the controller is configured to cause the electromagnetic coil to generate the magnetic flux, wherein the magnetic flux causes the pair of clutch plates to close the air gap between the first friction face and the second friction face.

In some examples, the disclosure describes a method of engaging an electromagnetic clutch, the method comprising rotating a first clutch plate around a rotational axis, wherein a second clutch plates is located adjacent to the first clutch plate with an air gap between the first clutch plate and the second clutch plate; and generating a magnetic flux with an electromagnetic coil, the electromagnetic coil including one or more conductors circumferentially wound around the air gap, wherein the magnetic flux is configured to close the air gap between the first clutch plate and the second clutch plate.

The details of one or more examples are set forth in the accompanying drawings and the description below. Other features, objects, and advantages will be apparent from the description and drawings, and from the claims.

DETAILED DESCRIPTION

Figure 1:
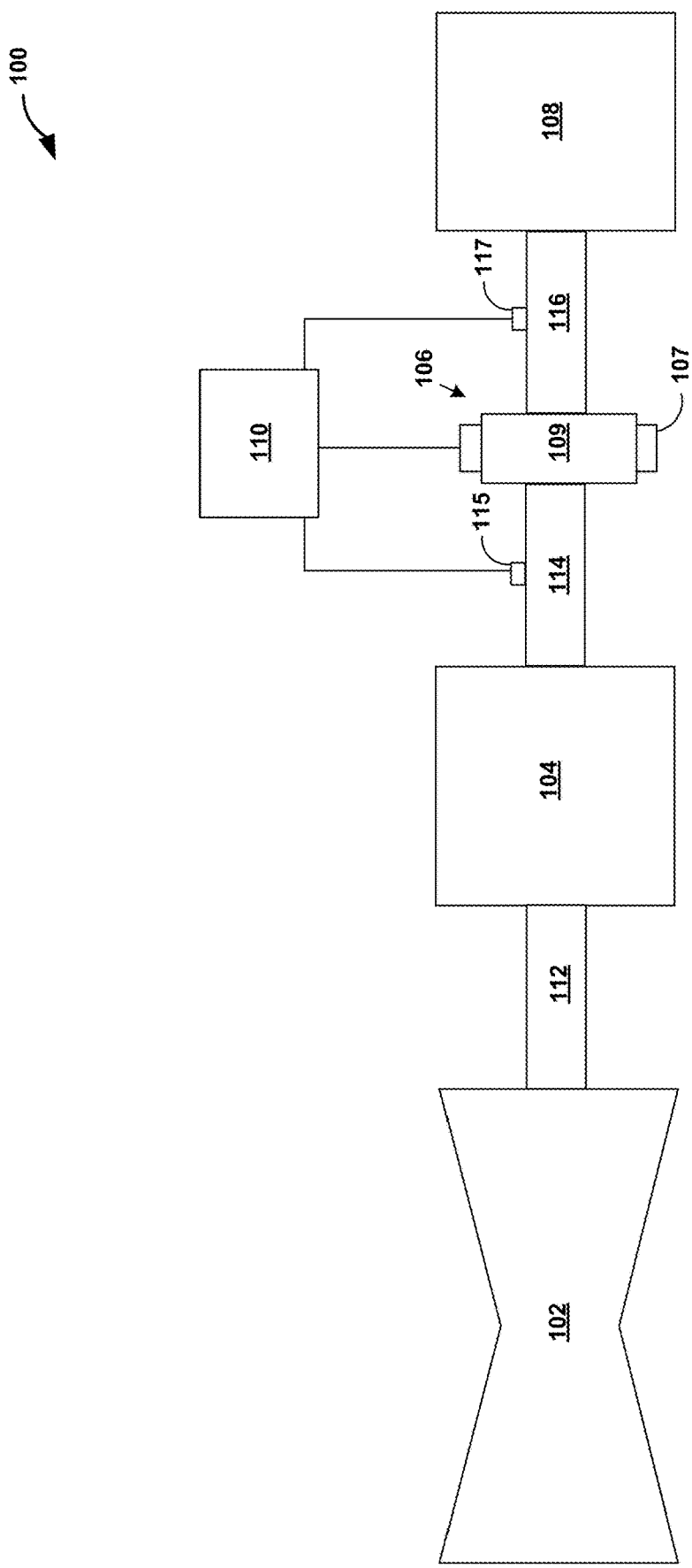
FIG. 1 is a conceptual diagram illustrating an example system including an example electromagnetic clutch assembly.

The disclosure generally describes articles, systems, and techniques that include an electromagnetic clutch including an electromagnetic coil located circumferentially and radially outward relative to first and second clutch plates of the assembly (e.g., circumferentially and radially outward located relative to an air gap between the respective plates when a magnetic field is not applied by the coil).

In some examples, electromagnetic clutch assemblies may be used to control engagement of system accessories, such as aircraft accessories of gas turbine engine systems. For example, restarting accessories shutdown during operation of a turbine engine may require a friction engagement to restart the accessory. During operation, engagement of an idle accessory may result in undesirable wear of clutch faces that mechanically couple the accessory to the turbine engine.

In some examples, an electromagnetic clutch assembly may include two clutch plates (e.g., a rotor and an armature) and an electromagnet in the form of a coil wound about the rotational axis of the rotor. The electromagnetic coil may be located behind and within the radius of a rotor plate (e.g., such that the rotor is between the coil and the armature). To frictionally engage the armature and rotor, a current may be conducted through the electromagnetic coil to produce a magnetic field that magnetizes the rotor and sets up a magnetic loop that attracts the armature. The magnetic attraction may close an air gap between the rotor and armature and a frictional force is generated when the armature contacts the rotor that allows rotational motion to be transferred from the rotor to the armature.

In such a design, slots or recesses may be formed in the face of the rotor and/or armature to weave the magnetic flux in a manner that achieves a relatively high attractive force between the rotor and armature. However, the slots or recesses in the face(s) may reduce field attraction area between the rotor and armature, reduce heat transfer area between the rotor and armature, and/or limit the operating speed of the clutch assembly when the rotor and armature are engaged due to separated sections which result in high connector stresses. In some examples, such a design may require bearing to locate the two halves closely.

In accordance with examples of the disclosure, an electromagnetic clutch assembly may include two clutch plates with opposing frictional faces and an electromagnetic coil circumferentially located and radially outward from the clutch plates. In the absence of a magnetic field, the frictional face of the first clutch plate and the frictional face of the second clutch plate may define an air gap between the respective clutch plates. In response to a magnetic field generated by the circumferentially located coil, the clutch plates may be magnetically attracted to each other in a manner that closes the air gap between the frictional face of the clutch plates to bring the clutch plates into contact with each. When in contact with each other in the presence of the generated magnetic field, the clutch plates may be engaged (e.g., frictionally) such that rotational motion may be transferred from one of the clutch plates to the other clutch plate. The clutch plates may be configured to transition back to a disengaged configuration in which the air gap is present between the opposing frictional faces when the magnetic field is not generated by the coil.

Examples of the electromagnetic clutch assembly described herein may provide improvements over other electromagnetic clutch assemblies, such as those clutch assemblies with a coil located behind the rotor and within the circumference of the rotor. For example, the contact surface area between the respective clutch plates in contact with each other when frictionally engaged may be increased compared to electromagnetic clutches with slots or recesses in the face of a rotor for weaving of the magnetic flux. The increase in contact surface area may reduce the contact pressure between the plates while still allowing for suitable frictional engagement and/or eliminates the need for flux weaving. In some examples, a design with a circumferentially and radially outward located coil may eliminate bearing by bolting a common hub to the drive and drive components. In some examples, such a design may improve the durability and power density of the clutch, e.g., as compared to clutch assemblies with a coil located behind the rotor and within the circumference of the rotor.

FIG. 1 is a conceptual diagram illustrating an example system 100 including an electromagnetic clutch assembly 106. System 100 may include, for example, an engine 102, an accessory gear box 104, an electromagnetic clutch assembly 106, an accessory component 108 (accessory 108), and a controller 110. As will be described further below, clutch assembly 106 includes two clutch plates 109 (individually shown as first clutch plate 122 and second clutch plate 124 in FIGS. 2A-2C) and electromagnetic coil 107 located circumferentially relative to clutch plates 109 and/or an air gap between clutch plates 109 when not frictionally engaged. System 100 may include any suitable mechanical system. In some examples, system 100 may include at least a portion of a mechanical system of a vehicle powered by an internal combustion engine. In some examples, system 100 may include at least a portion of a mechanical system of an aircraft powered by a gas turbine engine.

Engine 102 is mechanically coupled to accessory gear box 104 via drive shaft 112. Engine 102 is configured to rotate (e.g., drive) drive shaft 112. Although illustrated as a gas turbine engine, in other example, engine 102 may include other devices configured to output shaft work, such as internal combustion engines, fuel cells, electric motors or generators, pneumatic motors, or hydraulic motors.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or tower shaft. In some examples, drive shaft 112 may include an intermediate gearbox.

Accessory gearbox 104 is configured to transfer shaft work from drive shaft 112 to input shaft 114. In some examples, accessory gearbox 104 may include an accessory drive of a gas turbine engine system. Input shaft 114 is configured to drive one or more accessories of system 100. Although illustrated as a single input shaft 114, system 100 may include two or more input shafts driven by drive shaft 112 via accessory gearbox 104. For example, accessory gearbox 104 may include a plurality of spur gears mechanically coupling drive shaft 112 to respective input shaft of a plurality of input shafts 114, each at a selected gear ratio.

Input shaft 114 is coupled to an output shaft 116 via an electromagnetic clutch assembly 106. For example, input shaft 114 may be coupled to a first clutch plate (e.g., first clutch plate 122 of FIGS. 2A-2C) of electromagnetic clutch assembly 106, and a second clutch plate (e.g., second clutch plate 124 of FIGS. 2A-2C) of electromagnetic clutch assembly 106 may be coupled to output shaft 108. Output shaft 116 is mechanically coupled to accessory 108. Accessory 108 may include, for example, one or more of fuel pumps, generators, constant speed drives, oil pumps, hydraulic pumps, compressors, engine starters, tachometer sensor drives, and auxiliary gearbox drives.

Electromagnetic clutch assembly 106 includes an electromagnetic coil 107 configured to control engagement of electromagnetic clutch assembly 106. For example, electromagnetic clutch assembly 106 may be configured to, in response to a magnetic field generated by electromagnetic coil 107, engage (or disengage) input shaft 114 with (from) output shaft 116. In some examples, electromagnetic coil 107 may wound around the rotational axis of the clutch assembly, such as, for example, around at least a portion of output shaft 116 or input shaft 114. As described herein, electromagnetic coil 107 may be wound about the outer circumference of clutch plates 109, e.g., aligned or at least partially overlapping with the air gap between clutch plates 109 when disengaged, and may be radially outward from clutch plates 109 with reference to the rotational axis of input shaft 114.

In some examples, system 100 may include at least one of rotational sensors 115 and 117. Rotational sensors 115 and 117 are configured to sense a rotational speed of input shaft 114 (or a first clutch plate coupled to input shaft 114) and output shaft 116 (or a second clutch plate coupled to output shaft 116), respectively. For example, rotational sensors 115 and/or 117 may include one or more of a reflective sensor, an interrupter sensor, an optical encoder, a variable-reluctance sensor, an eddy-current killed oscillator sensor, a Wiegand sensor, or a Hall-effect sensor. In some examples, rotational sensors 115 and/or 117 may be configured to determine a rotation of input shaft 114 or output shaft 116, respectively, based on sensing a target disposed on input shaft 114 (of the first clutch plate) or output shaft 116 (or the second clutch plate). In some examples, controller 110 may be configured to receive signals from at least one of rotational sensors 115 or 117 and control, based on a rotational speed determined based on the signal, an electrical current applied to electromagnet 107.

Controller 110 is communicatively coupled to electromagnetic coil 107 and configured to control the magnetic field generated by electromagnet coil 107. Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, electromagnetic coil 107. Controller 110 may be communicatively coupled to electromagnetic coil 107, sensors 115 and/or 117, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. For example, controller 110 may include processing circuitry configured to determine an electrical current to apply to electromagnetic coil 107. In some examples, the electrical current may be based on, at least in part, a selected magnetic field, a selected magnetic flux, and/or a selected magnetic force (e.g., between the first clutch plate and the second clutch plate). In this way, controller 110 may be configured to control the mechanical coupling of engine 102 to accessory 108.

Figure 2A:
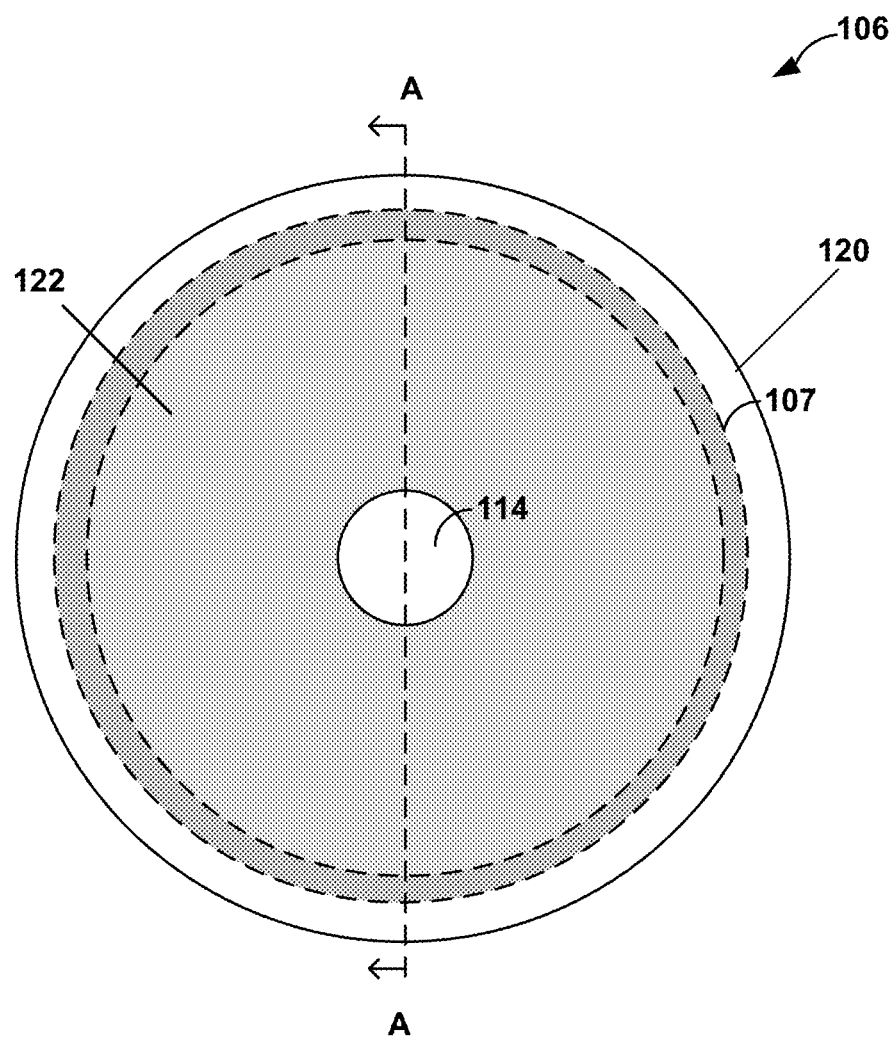
FIGS. 2A-2C are conceptual diagrams illustrating various view of the example electromagnetic clutch assembly of FIG. 1.
Figure 2B:
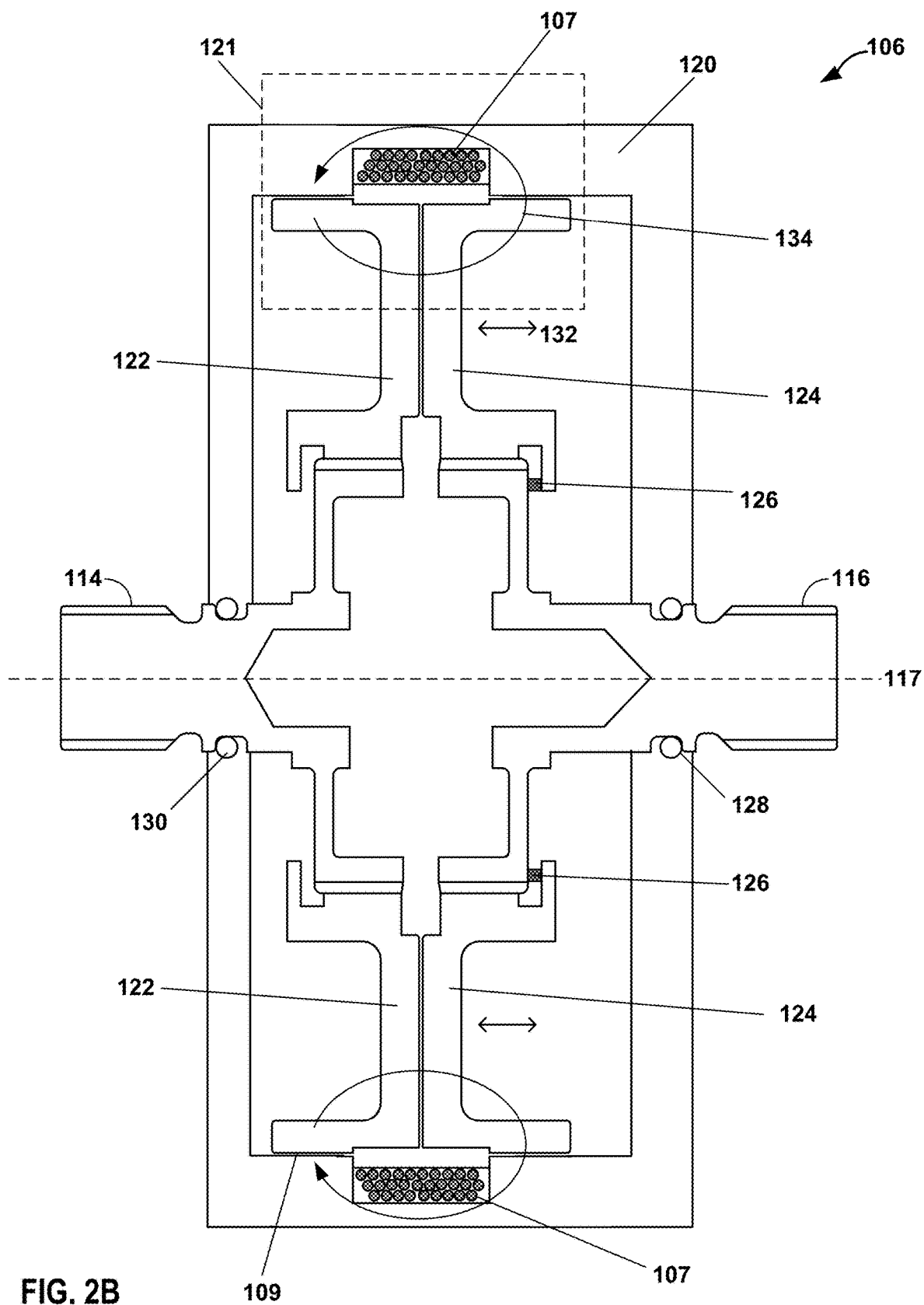
Figure 2C:
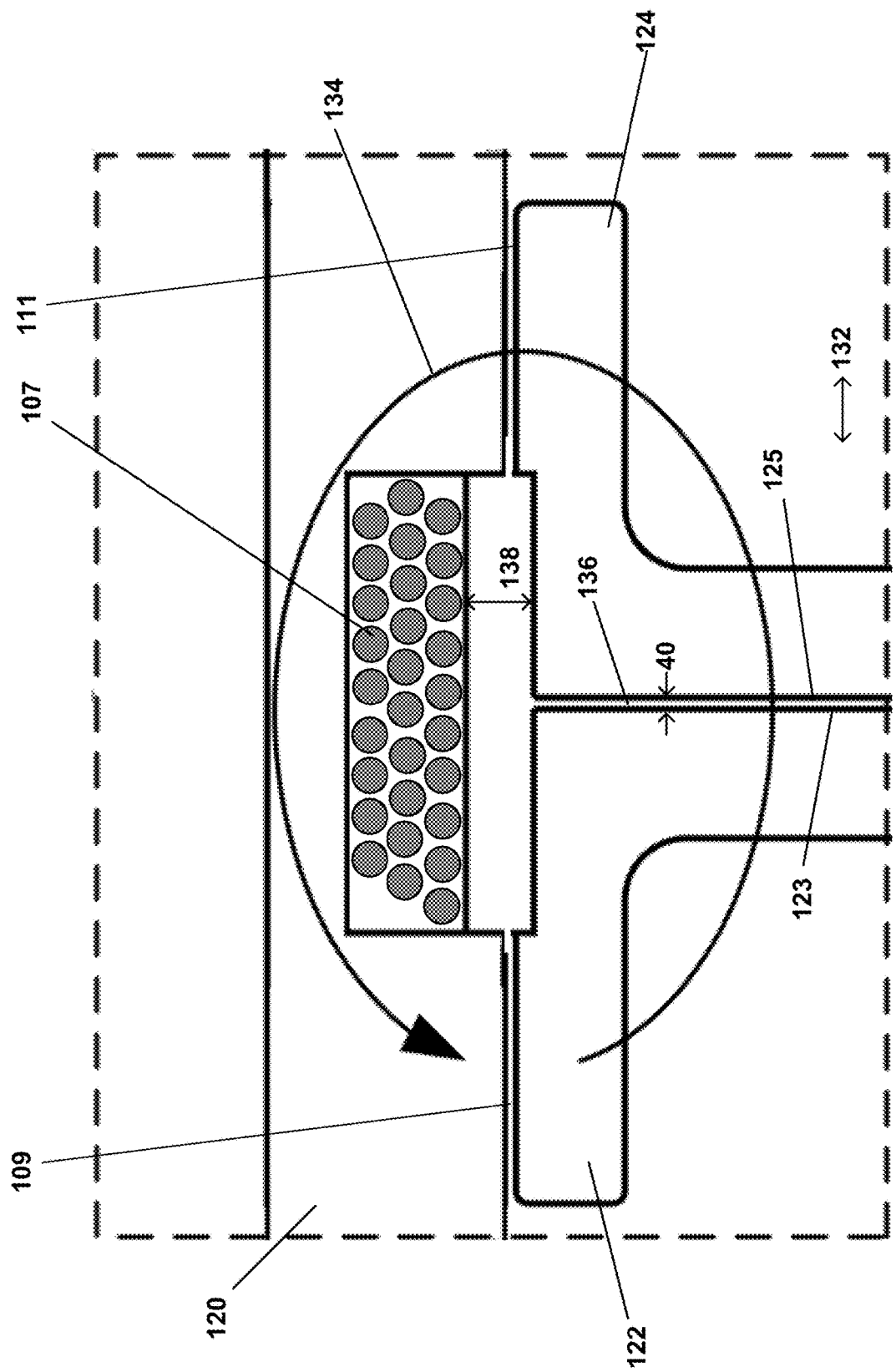

Electromagnetic clutch assembly 106 includes clutch plates 109. First clutch plate 122 and second clutch plate 124 in FIGS. 2A-2C are examples of clutch plates 109. Each of clutch plates 109 is configured to rotate around a rotational axis. At least one clutch plates of clutch plates 109 is translatable in the axial direction along the rotational axis of clutch plates 109. In the absence of a magnetic field, clutch plates 109 are configured to define an air gap between the respective frictional faces. Electromagnetic coil 107, under the control of controller 110, may be configured to selectively generate a magnetic field as a selected magnetic flux passing through at least a portion of electromagnetic clutch assembly 106, e.g., the first clutch plate and the second clutch plate of electromagnetic clutch assembly 106. The generated magnetic field may cause axial movement of the first clutch plate toward the second clutch plate, the second clutch plate toward the first clutch plate, or both. The relative movement of the clutch plate may close the air gap and frictionally engaged the opposing faces of the clutch plates. When engaged in the presence of the generated magnetic field, rotational motion of one clutch plate may be transferred to the other clutch plate to drive the other clutch plate. Electromagnetic coil 107, under the control of controller 110, may be configured to selectively terminate the generated magnetic field to disengage the clutch plates from one another and return to a state in which an air gap exists between the frictional faces of the clutch plates.

FIGS. 2A-2C are conceptual and schematic diagrams illustrating various view of an example electromagnetic clutch assembly 106. FIG. 2A is a conceptual diagram illustrating clutch assembly 106 from a cross-section of input shaft 114 and facing clutch assembly 106. FIG. 2B is a conceptual and schematic diagram illustrating clutch assembly 106 along cross-section A-A in FIG. 2A. FIG. 2C is a magnified view of portion 121 indicated in FIG. 2B.

As shown, clutch assembly 106 includes clutch housing 120 which encloses first clutch plate 122, second clutch plate 124, and electromagnetic coil 107 (also referred to as coil 107).

First clutch plate 122 is coupled to input shaft 114 (e.g., via mechanical fasteners such as bolts) such that the rotation of input shaft 114 about rotational axis 117 drives the rotation of first clutch plate 122. Second clutch plate 124 is couple to output shaft 117 (e.g., via mechanical fasteners such as bolts) such that the rotation of second clutch plate 124 drives the rotation of output shaft 116 about rotational axis 117. Spring 126 may bias second clutch plate 124 away from first clutch plate 122 along pathway 132 so that air gap 136 is present when clutch plates 122, and 124 are in an disengaged state. While spring 126 is shown acting on second clutch plate 124, assembly 106 may additionally or alternatively include a similar spring that biases first clutch plate 122 away from first clutch plate 124.

First and second clutch plates 122 and 124 may be in the shape of an annular ring. First clutch plate 122 defines first frictional face 123 that is generally opposed to second frictional face 125 defined by second clutch plate 124. First friction face 123 and/or second frictional face 125 may be substantially planar surfaces (e.g., without slot or recesses formed in the faces at one or more radial locations). When clutch assembly 106 is in a disengaged state, air gap 136 exists between first clutch plate 122 and second clutch plate 124. When disengaged, first clutch plate 122 may rotate about rotational axis 117 (e.g., when driven by input shaft 114) without driving second clutch plate 124 or otherwise contacting second frictional face 125 of second clutch plate 124. When clutch assembly 106 is engaged under the control of controller 110, second clutch plate 124 is moved towards first clutch plate 122 along path 132 such that first frictional face 123 of first clutch plate 122 contacts second frictional face 124 of second clutch plate 124 without air gap 136. The contact between frictional faces 123 and 124 allows for the transfer of rotational motion from first clutch plate 122 to second clutch plate 124, e.g., such that the rotation first clutch plate 122 by input shaft 114 drives the rotation of second clutch plate 124 and, thus, output shaft 116.

First clutch plate 122 and second clutch plate 124 may include any suitable material or combination of materials. In some examples, first clutch plate 122 and second clutch plate 124 may include a ferromagnetic material that is configured to be magnetized in a magnetic field such as magnetic field 134. Example materials that may be used to form clutch plates 122, 124 may include metals or metal alloys. In some examples, first clutch plate 122 and/or second clutch plate 124 may include a coating that defines friction face 123 and 125, respectively. The coating may be configured to improve or otherwise provide desired properties to the friction surfaces of the plates 122, 124 (e.g., to improve wear and/or frictional engagement between the plates). In some examples, such a coating may be a carbon coating.

Clutch assembly 106 includes coil 107. Coil 107 includes a conductor wound one or more times generally about rotational axis 117. The individual conductors of coil 107 are shown in the cross-sectional view of FIGS. 2B and 2C. As shown in FIGS. 2A-2C, coil 107 is positioned circumferentially relative to the outer perimeter 109 of first clutch plate 122 and outer perimeter 111 of second clutch plate 124, e.g., as compared to being located within the diameter of plates 122 and 124 and behind one of plate 122, 124 (e.g., with the coil being separated from second plate 124 by first plate 122). In the example of FIGS. 2A-2C, coil 107 is located over air gap 136 between first clutch plate 122 and second clutch plate 124 when the plates are disengaged. In some examples, coil 107 is located such that the center of coil 107 is substantially aligned with air gap 136, as shown in FIG. 2C. In other examples, coil 107 may be axially biased towards first clutch plate 122 (e.g., where more of coil 107 is over plate 122 compared to plate 124) or axially biased towards second clutch plate 124. Coil 107 may not be in contact with first clutch plate 122 or second clutch plate 124. For example, gap 138 (e.g., air gap) may be present between the nearest boundary of coil 107 and outer perimeters 109, 111 of clutch plates 122, 124.

Coil 107 is configured such that magnetic field 134 is generated by conducting a current through the conductors of coil 107. The shape and magnitude of magnetic field 134 may be provided such that first clutch plate 122 and second clutch plate 124 are magnetized and, as a result, magnetically attracted to each other so that first friction face 123 is in contact with second friction face 125. When first friction face 123 is in contact with second friction face 125, at least a portion of plates 122, 124 may be within the core of coil 107 (where the core is defined in the axial and radial direction by the windings of coil 107).

In operation, to engage clutch assembly 106 to transfer rotational motion from input shaft 114 to output shaft 116 via plates 122, 124, controller 110 may control the conduction of a current through coil 107 to generate magnetic field 134. Magnetic field 134 may magnetize first clutch plate 122 and second clutch plate 124 such that the attractive force between the two plates 122, 124 moves second clutch plate 124 along pathway 132 towards first clutch plate 122 to close air gap 136 and bring second frictional face 125 into contact with first frictional face 123. The magnitude of the attractive force may be sufficient to frictionally engage first friction surface 123 and second friction surface 125 such that rotation motion is transfer from input shaft 114 to output shaft 116 via plates 122 and 124 in the presence of magnetic field 134. In some examples, when engaged, the rotational speed of second clutch plate 122, as well as output shaft 116, may be substantially the same as the rotational speed of first clutch plates 122, as driven by input shaft 114.

To disengage first clutch plate 122 and second clutch plate 124 (e.g., to stop the transfer of rotational motion from input shaft 114 to output shaft 116), controller 110 may modified the magnetic field 134 generated by coil 107 such that the attractive force between plates 122, 124 is less than the force of spring 126 biasing second plate 124 away from first plate 122. In some examples, controller 110 may stop the conduction of current being conducted through coil 107 to stop the generation of magnetic field 134 and allow spring to move second plate 124 away from first plate 122 along pathway 132. In other examples, controller 110 may reduce the current being conducted through coil 107 such that a magnetic field 134 is still present but the resulting attractive force between plates 122, 124 is less than the force of spring 126 biasing second plate 124 away from first plate 122.

Magnetic field 134 that is generated by coil 107 may be any suitable magnetic field that allows clutch assembly 106 to function as described herein. In some examples, coil 107 may be configured such that the magnetic flux of the generated magnetic field 134 passes through first clutch plate 122 and second clutch plate 124 in a substantially orthogonal direction relative to first friction face 123 and second friction face 124. In some examples, coil 107 may be configured such that the magnetic flux of the generated magnetic field 134 that passes through first clutch plate 122 and second clutch plate 124 is substantially parallel to rotational axis 117. In some examples, magnetic field 134 generated by coil 107 may define a north pole and south pole. The area of contact between first friction face 123 and second friction face 125 may be between (e.g., in an axial direction) the north and south poles of magnetic field 134 such that first plate 122 is attracted to second plate 124 in the presence of magnetic field 134 in the manner described herein.

Air gap 136 between first friction surface 123 and second friction surface 125 when clutch assembly 106 is in an disengaged state may be any suitable amount. Similarly, gap 138 between coil 107 and outer perimeter 111 of first plate 122 and/or outer perimeter 111 of second plate 124 may be any suitable amount. In some examples, gap 138 may be greater than gap 136.

In some examples, gap 138 and/or air gap 136 may be selected such that an effective magnetic reluctance resulting from gap 138 is greater than a second reluctance defined by a flux pathway from first clutch plate 122, air gap 136, and second clutch plate 124. In this manner, the relative reluctance of assembly 106 in the area coil 107 and plates 122, 124 may allow for a greater magnetic flux through first plate 122 and second plate 124 (e.g., across air gap 136) when magnetic field 134 is generated to engage first friction face 123 and second friction face 125 as described herein.

Coil 107 may be formed of a wire or filament of conductive material that is suitable for conducting a current that induces magnetic field 134. Example materials for coil 107 may include copper and/or aluminum although other electrically conductive materials are contemplated. Coil 107 may have any suitable number of winding about rotational axis 117. The number of winding may be determined based on the strength of the magnetic field 134 to be generated by conducting a current through coil 107. In some examples, coil 107 may have one or more winding about axis 117, such as, at least two windings, or more than two windings. Other values are contemplated.

Figure 3:
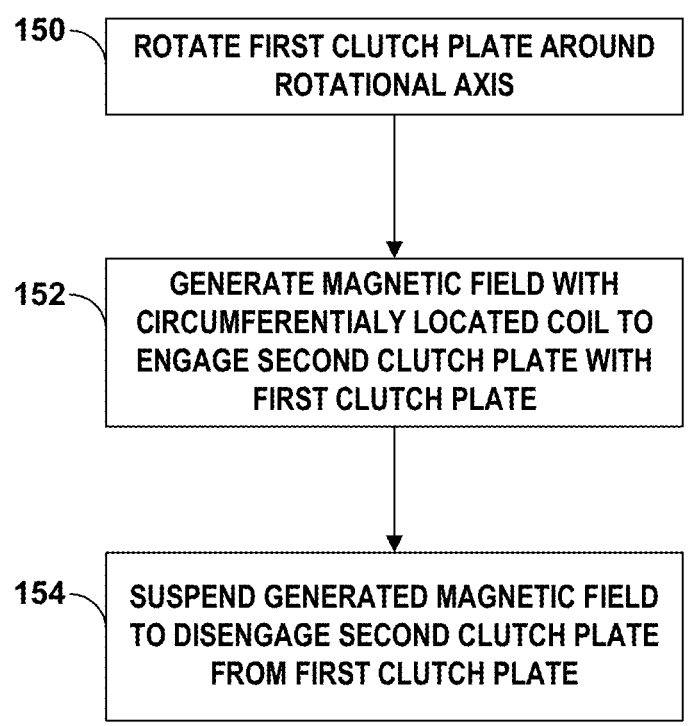
FIG. 3 is a flow diagram illustrating an example technique for controlling engagement of an engine with an accessory using an example electromagnetic clutch assembly having a circumferentially located electromagnetic coil.

FIG. 3 is a flow diagram illustrating an example technique for controlling engagement of an engine with an accessory using an electromagnetic clutch assembly. Using the technique of FIG. 3, controller 110 may control system 100 to selectively transfer rotational motion from accessory gear box 104 to accessory component 108 via clutch assembly 106. For ease of description, the example of FIG. 3 will be described with regard to system 100 and electromagnetic clutch assembly 106 described above. However, the technique may be used to control other systems and clutch assemblies. Additionally, system 100 and electromagnetic clutch assembly 106 may be controlled using other techniques.

The technique illustrated in FIG. 3 may include rotating first clutch plate 122 around rotational axis 117 (150). As discussed above, engine 102 may be configured to rotate, e.g., via drive shaft 112, accessory gear box 104, and input shaft 114, first clutch plate 122. Second clutch plate 124 may be disengaged from first clutch plate during the rotation of first clutch plate 122, e.g., with spring 126 biasing second clutch plate 124 away from first clutch plate 122 such that air gap 136 is present between first friction surface 123 and second friction surface 125.

The technique illustrated in FIG. 3 also may include generating magnetic field 134 with circumferentially located coil 107 to engage second clutch plate 124 with first clutch plate 122 (e.g., while first clutch plate 122 is rotating) (152). For example, to engage the clutch plates, controller 110 may control electromagnetic coil 107 to generate a magnetic field with a magnetic flux passing through at least a portion first clutch plate 122 and second clutch plate 124. Coil 107 may generate magnetic field by a current conducted through the conductors of coil 107. The current may be supplied by any suitable power source and suitable circuitry, and may be selectively conducted under the control of controller 110. In response to magnetic field 134 generated by coil 107, first clutch plate 122 and second clutch plate 124 may be magnetized such that second plate 124 is moved axially towards first clutch plate 122 by the resulting attractive force until second friction face 125 is in contact with first friction face 123 without air gap 136. The attractive force resulting from magnetic field 134 may be greater than the force biasing second clutch plate 124 away from first clutch plate 122. Magnetic field 134 generated by coil 107 may be configured such that the frictional engagement between first friction face 123 and second friction face 125 allows for the transfer of rotational motion from input shaft 114 to output shaft 116 by way of first clutch plate 122 and second clutch plate 124.

In some examples, controller 110 may engage first clutch plate 122 and second clutch plate 124 by transitioning from a state of substantially no magnetic field generated by coil 107 (e.g., by not conducting current through coil 107) to a state in which current is conducted through coil 107 to generate a magnetic field that is sufficient to bring second clutch plate 124 into contact with first clutch plate along frictional faces 123, 125. Alternatively, coil 107 may initially be in a state in which a magnetic field is generated with some current being conducted but that is insufficient to overcome the bias of spring 126 or otherwise bring plates 122, 124 into contact with each other, and then controller 110 may increase the current or otherwise modify the conducted current such that magnetic field 134 is generated that is sufficient to frictionally engage plates 122, 124 in the manner described herein.

As shown in FIG. 3, controller 110 may subsequently control coil 107 to suspend or terminate the generation of magnetic field 134 to disengage second clutch plate 124 from first clutch plate 122 (154). Second clutch plate 124 may be disengaged by reducing the attractive force between first clutch plate 122 and second clutch plate 124 to be less than the biasing force applied by spring 126 so that second clutch plate 124 is move axially away from first clutch plate 122. When disengage, air gap 136 may be present between first and second clutch plates 122, 124. In some examples, coil 107 may be adjusted to a state in which substantially no magnetic field is generated to disengage first and second plates 122, 124 from each other. In other examples, coil 107 may be adjusted to a state in which a magnetic field is still generated but the magnetic field does not result in an attractive force between first and second plates 122, 124 that is greater than the biasing force applied by spring 126. When disengaged, rotational motion is not transfer from input shaft 114 to output shaft 116 by way of first and second plates 122, 124.

Figure 4:
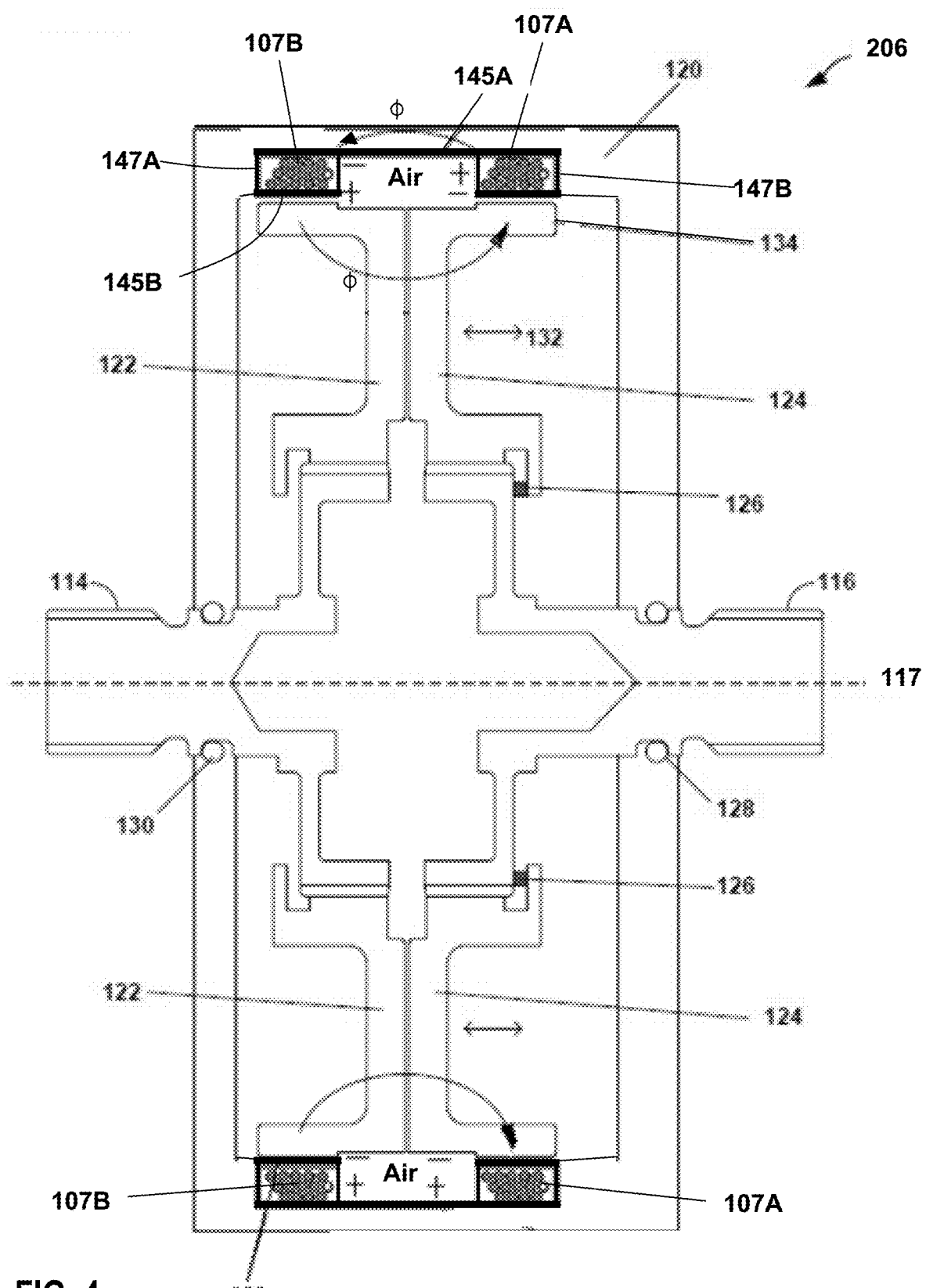
FIG. 4 is a conceptual diagram illustrating another example electromagnetic clutch assembly.

FIG. 4 is a conceptual diagram illustrating another example electromagnetic clutch assembly 206. Clutch assembly 206 is similar to clutch assembly 106 shown in FIGS. 2B and 2C, for example, and like features are similarly numbered. Unlike clutch assembly 106 with a single coil 107, clutch assembly include two coils (i.e., first coil 107A and second coil 107B). Like coil 107, each of first coil 107A and second coil 107B includes a conductor wound one or more times generally about rotational axis 117. First coil 107A and second coil 107B are wound polar opposite (−/+ and +/−). An air gap or other open volume may be present between coil 107A and 107B, as shown in FIG. 4.

Like that of assembly 206, first and second plates 122, 124 may be selected engaged and disengaged by controlling the conduction of current through coils 107A and 107B. For example, as labelled adjacent to coils 107A and 107B with (−/+ and +/−) in the top portion of FIG. 4, in a first operating mode, current may be conducted through each of coils 107A and 107B so that an attractive polarity is generated to engage plates 122, 124. Conversely, as labelled adjacent to coils 107A and 107B with (−/+ and −/+) in the bottom portion of FIG. 4, in a second operating mode, current may be conducted through each of coils 107A and 107B so that the polarity is changed from that in the first operating mode and, thus, a repulsive polarity is generated to disengage plates 122, 124. This may allow for spring 126 to not be included in assembly 206 or the repulsive polarity may be used selectively if it determined or suspected that there is a problem with spring 126 operating to disengage plates 122, 124, as described above. For clarity, it is noted that the respective polarities for coils 107A and 107B on the top portion of the assembly 206 in FIG. 4 are indicated for attraction between plates 122, 124 and the respective polarities for coils 107A and 107B on the bottom portion of the assembly 206 are indicated for repulsion between plates 122, 124 merely for illustration of the two different modes. It is recognized that both the top and bottom portion would have the same polarities as each other at a point in time rather than the top portion being opposite from the bottom portion.

First coil 107A and second coil 107B may be at least partially enclosed in a surrounding sleeve of magnetic conductive material. For example, as shown in FIG. 4, the surrounding sleeve may include top portion 145A and bottom portion 145B formed of a magnetic conductive material, such as, e.g., steel. In some examples, the vertical sides connecting top portion 145A and bottom portion 145B, such as sides 147A and 147B, may be formed of a magnetic conductive material. In other examples, the vertical sides may be formed of nonconductive sides, which may further improve flux flow to plates 122, 124. The outer sleeve sends flux from one coil to the next and the flux is added to the path thru plates 122 and 124.

In some examples, the configuration of assembly 206 may allow for the elimination of slots or recesses in faces 123, 125 of plates 122, 124 required for flux weaving associated with other clutch assembly designs. For example, plates 122, 124 being solid with substantially planar friction faces 123, 125 may allow higher speed of operation.

In the example of FIG. 4, two coils 107A and 107B (or poles) are shown. First coil 107A may be on one side of the plane along which friction faces 123, 125 engage. In other examples, assembly 206 may include only a single coil (e.g., only 107A or 107B) with the other side being filled with steel or other magnetic conductive material in place of the second coil. In such an example, the flux generated by the single coil may be approximately half that generated by the two coil configuration.

Figure 5:
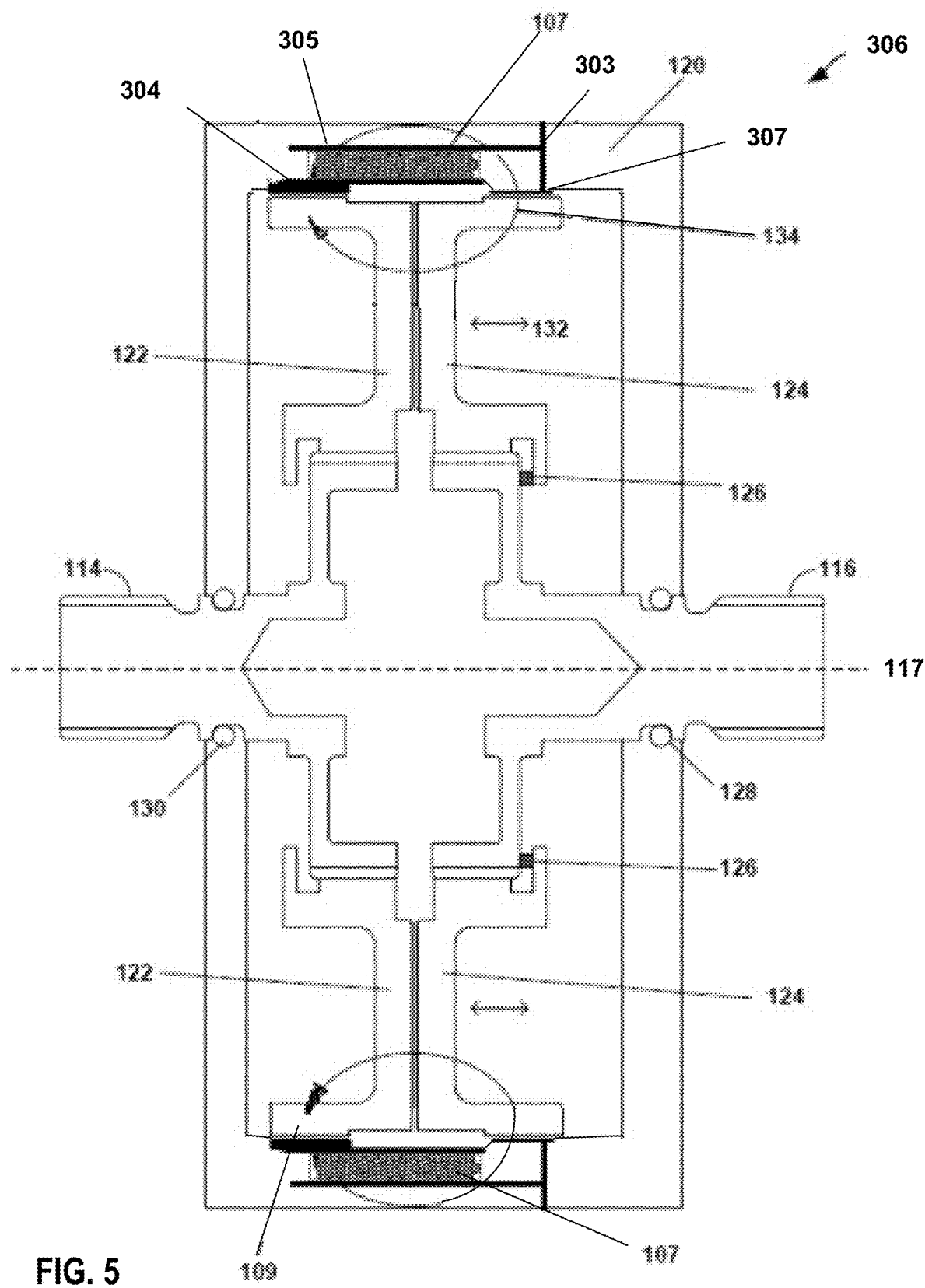
FIG. 5 is a conceptual diagram illustrating another example electromagnetic clutch assembly.

FIG. 5 is a conceptual diagram illustrating another example electromagnetic clutch assembly 306. Clutch assembly 306 is similar to clutch assembly 106 shown in FIGS. 2B and 2C and clutch assembly 206 of FIG. 4, for example, and like features are similarly numbered.

Assembly 306 includes single coil 107, which is shown with a flux generated around plates 122 and 124 for attraction between plates 122 and 124 to engage friction faces 123, 125. As described for assembly 106, the flux may be generated by applying a current through coil 107. The attractive force may be discontinued to disengage friction faces 123, 125 as described above, e.g., with spring 126 applying a bias to separate plates 122, 124. Coil 107 may be pressed within a metallic sleeve formed by metallic members 305, 303, and 307. The metallic sleeve may be positioned around coil 107, e.g., with coil 107 pressed within the sleeve. The coil and sleeve may be bolted in place in housing 120 by bolting the flange defined by metallic member 303. In operation, flux is transferred from the sleeve to plate 124. Metallic member 404 may be another sleeve pressed into the inner diameter of coil 107, which transfers the flux to plate 122. Some or all of metallic members 303, 304, 305, and 307 may be a magnetically conductive material such as steel. In some examples, the configuration of assembly 306 may allow for the elimination of slots or recesses in faces 123, 125 of plates 122, 124 required for flux weaving associated with other clutch assembly designs. However, some examples, such slots or recesses may be included in faces 123, 125. In each of assemblies 206 and 306, the design may be relatively symmetrical and the poles and hubs may be relatively simple in design and manufacture.

Example of the present disclosure may provide for one or more benefits. For example, employing a circumferentially located electromagnetic coil in the manner described herein may allow for an increase in surface area between friction faces of opposing clutch plates for a given total amount of area, e.g., as compared to assemblies in which slots or recesses are formed in the friction faces. Additionally, or alternatively, the pressure between friction faces of opposing clutch plates may be reduced while still allowing for adequate frictional engagement between clutch plates (e.g., because of the increased contact between plates). Furthermore, thermal energy distribution through the plates may be improved (e.g., due to the increased amount of contact between clutch plates compared to clutch plates with slots or recesses). Also, flux weaving may not be required in examples of the disclosure (e.g., as compared to examples in which the electromagnetic coil is position axially behind a clutch plate at a radial position within the outer perimeter of the clutch plate). In some examples, a reduced amount of reluctance in the design may be exhibited based on the design.

In some examples of the disclosure, potential facing material may be employed. Additionally, or alternatively, simple replacement parts may be used in such an assembly. Additionally, or alternatively, bearings may be eliminated from one or more portions of the assembly. Additionally, or alternatively, a reduced amount of friction may be achieved.

Various examples have been described. These and other examples are within the scope of the following claims.

What is claimed is:

1. An electromagnetic clutch assembly comprising:
   a pair of clutch plates comprising:
   a first clutch plate configured to rotate around a rotational axis; and
   a second clutch plate configured to rotate around the rotational axis, wherein an air gap is between the first clutch plate and the second clutch plate when the pair of clutch plates is in an disengaged configuration; and
   an electromagnetic coil circumferentially surrounding the air gap, wherein the electromagnetic coil is configured to generate a magnetic flux passing through the first clutch plate and the second clutch plate, wherein the pair of clutch plates define the air gap between the first clutch plate and the second clutch plate in the absence of the magnetic flux, and wherein the magnetic flux is configured to cause at least one of the first clutch plate or the second clutch plate to move to close the air gap, wherein the first clutch plate is configured to contact the second clutch plate over a contact area when the pair of clutch plates close the air gap, and wherein the first clutch plate and second clutch plate define a contiguous ferromagnetic core within a core of the electromagnetic coil when the pair of clutch plates close the air gap, wherein the electromagnetic clutch assembly defines a first magnetic reluctance between the electromagnetic coil and the contact area, and a second magnetic reluctance through the first clutch plate, the air gap, and the second clutch plate, wherein the first magnetic reluctance is greater than the second magnetic reluctance.

2. The electromagnetic clutch assembly of claim 1, wherein the electromagnetic coil is configured to generate the magnetic flux having a magnetic axis that is substantially parallel to the rotational axis as the magnetic flux passes through the first clutch plate and the second clutch plate.

3. The electromagnetic clutch assembly of claim 1, wherein the electromagnetic coil includes one or more conductors wound around the rotational axis.

4. The electromagnetic clutch assembly of claim 1, wherein the first clutch plate comprises a first friction surface and the second clutch plate comprises a second friction surface, wherein the first friction surface faces the second friction surface.

5. The electromagnetic clutch assembly of claim 4, wherein the pair of clutch plates are configured to contact the first friction surface and the second friction surface when the pair of clutch plates close the air gap in response to the magnetic flux passing through the first clutch plate and the second clutch plate.

6. The electromagnetic clutch assembly of claim 4, wherein the first friction surface and the second friction surface are within the core of the electromagnetic coil when the pair of clutch plates close the air gap.

7. The electromagnetic clutch assembly of claim 4, wherein the first friction surface is configured to drive the second friction surface in a rotational direction around the rotational axis when the first friction surface contacts the second friction surface and the first friction surface rotates in the rotational direction around the rotational axis.

8. The electromagnetic clutch assembly of claim 1, wherein the electromagnetic coil is configured to generate the magnetic flux passing through the first clutch plate and the second clutch plate and causing the first clutch plate to contact the second clutch plate over the contact area, wherein the first magnetic reluctance and the second magnetic reluctance is defined with respect to the magnetic flux.

9. The electromagnetic clutch assembly of claim 1, wherein the electromagnetic coil is configured to generate the magnetic flux having a north pole and a south pole, wherein the contact area is between the north pole and the south pole when the pair of clutch plates close the air gap.

10. The electromagnetic clutch assembly of claim 1, further comprising a spring configured to exert a spring force on the second plate in a direction away from the first clutch plate.

11. The electromagnetic clutch assembly of claim 10, further comprising a controller operatively connected to the electromagnetic coil, wherein the controller is configured to cause the electromagnetic coil to generate the magnetic flux overcoming the spring force and causing the pair of clutch plates to close the air gap.

12. An electromagnetic clutch assembly comprising:
   a pair of clutch plates comprising:
      a first clutch plate comprising a first friction face configured to rotate around a rotational axis; and
      a second clutch plate comprising a second friction face configured to rotate around the rotational axis, wherein the second friction face opposes the first friction face,
   an electromagnetic coil wound around an air gap, the air gap being between the first friction face and a second friction face, wherein the electromagnetic coil is configured to generate the magnetic flux passing through the first friction face and the second friction face;
   a controller operatively connected to the electromagnetic coil, wherein the controller is configured to cause the electromagnetic coil to generate the magnetic flux, wherein the magnetic flux causes the pair of clutch plates to close the air gap between the first friction face and the second friction face,
   wherein the first friction face and the second face surface are within a core of the electromagnetic coil when the pair of clutch plates close the air gap between the first friction face and the second friction face,
   wherein the first friction face and the second friction face contact over a contact area, wherein the electromagnetic clutch assembly defines a first magnetic reluctance between the electromagnetic coil and the contact area, and a second magnetic reluctance through the first clutch plate, the air gap, and the second clutch plate, and wherein the first magnetic reluctance is greater than the second magnetic reluctance.

\* \* \* \* \*